(12) United States Patent
Santarelli (10) Patent No.: US 10,907,621 B2
(45) Date of Patent: Feb. 2, 2021

(54) GEOTHERMAL POWER PLANTS

(71) Applicant: Geomec Engineering Ltd., London (GB)

(72) Inventor: Frederic Joseph Santarelli, Stavanger (NO)

(73) Assignee: GEOMEC ENGINEERING LIMITED

(*) Notice: Subject to any disclaimer, the term of this patent is extended or adjusted under 35 U.S.C. 154(b) by 52 days.

(21) Appl. No.: 16/330,147

(22) PCT Filed: Sep. 4, 2017

(86) PCT No.: PCT/GB2017/052566
§ 371 (c)(1),
(2) Date: Mar. 4, 2019

(87) PCT Pub. No.: WO2018/042201
PCT Pub. Date: Mar. 8, 2018

(65) Prior Publication Data
US 2019/0211810 A1   Jul. 11, 2019

(30) Foreign Application Priority Data

Sep. 5, 2016  (GB) .................................. 1615021.1

(51) Int. Cl.
*F03G 7/04* (2006.01)
*E21B 47/06* (2012.01)
(Continued)

(52) U.S. Cl.
CPC ................ *F03G 7/04* (2013.01); *E21B 47/06* (2013.01); *F24T 10/30* (2018.05); *F24T 2010/56* (2018.05); *Y02E 10/10* (2013.01)

(58) Field of Classification Search
CPC ....... F24T 10/00; F24T 10/30; F24T 2010/50; F24T 2010/53; F24T 2010/56; F03G 7/04;
(Continued)

(56) References Cited

U.S. PATENT DOCUMENTS 4,023,136 A   5/1977  Lamensdorf et al.
5,183,109 A   2/1993  Poulsen
(Continued)

FOREIGN PATENT DOCUMENTS

GB   2539056 A   12/2016

OTHER PUBLICATIONS

European Patent Office as International Search Authority; International Search Report for PCT/GB2017/052566; dated Dec. 22, 2017; entire document; EPO, Rijswijk, The Netherlands.
(Continued)

*Primary Examiner* — Mark A Laurenzi
*Assistant Examiner* — Mickey H France
(74) *Attorney, Agent, or Firm* — Law Office of Jesse D. Lambert, LLC (57) ABSTRACT

A geothermal power plant and method of operating a geothermal power plant in which control over the creation and growth of fractures in the geothermal formation is achieved. A downhole pressure gauge (14) with a high data acquisition rate is located in the injection or production well. Pressure changes in the well are recorded as a pressure trace and transmitted to the surface as data. The data is analysed to determine fracture parameters of the geothermal formation. The pump rate of the well is then varied in response to the calculated fracture parameter(s).

17 Claims, 7 Drawing Sheets

(51) Int. Cl.
*F24T 10/30* (2018.01)
*F24T 10/00* (2018.01)

(58) Field of Classification Search
CPC ......... Y02E 10/10; Y02E 10/14; Y02E 10/16; E21B 47/06
USPC .............................................. 60/641.2–641.5
See application file for complete search history.

(56) References Cited

U.S. PATENT DOCUMENTS

| | | | | |
|---|---|---|---|---|
| 5,720,598 | A | * | 2/1998 | de Chizzelle ........... F04B 51/00 417/53 |
| 9,090,810 | B2 | | 7/2015 | Bour et al. |
| 2006/0155473 | A1 | | 7/2006 | Soliman et al. |
| 2008/0119541 | A1 | * | 5/2008 | Zotchev ................. C07H 17/08 514/450 |
| 2010/0307755 | A1 | | 12/2010 | Xu et al. |
| 2011/0067857 | A1 | | 3/2011 | Underhill et al. |
| 2012/0181034 | A1 | | 7/2012 | Bour et al. |
| 2012/0199354 | A1 | | 8/2012 | Kaminsky |
| 2015/0075779 | A1 | * | 3/2015 | Walters ................. E21B 49/008 166/250.1 |
| 2015/0275638 | A1 | | 10/2015 | Wang et al. |
| 2019/0162871 | A1 | * | 5/2019 | Dell ....................... E21B 43/267 |

OTHER PUBLICATIONS

UK Intellectual Property Office; search report for GB1615021.1; dated Feb. 3, 2017; entire document; UK Intellectual Property Office, South Wales, UK.

Aqui, A.R. and Zarrouk, S.; Permeability Enhancement of Conventional Geothermal Wells; New Zealand Geothermal Workshop Proceedings; entire document; Nov. 21-23, 2011; Aukland, New Zealand.

\* cited by examiner

GEOTHERMAL POWER PLANTS

The present invention relates to geothermal power plants and more particularly to a method and apparatus for controlling fracture generation and growth in a geothermal formation.

Figure 1:
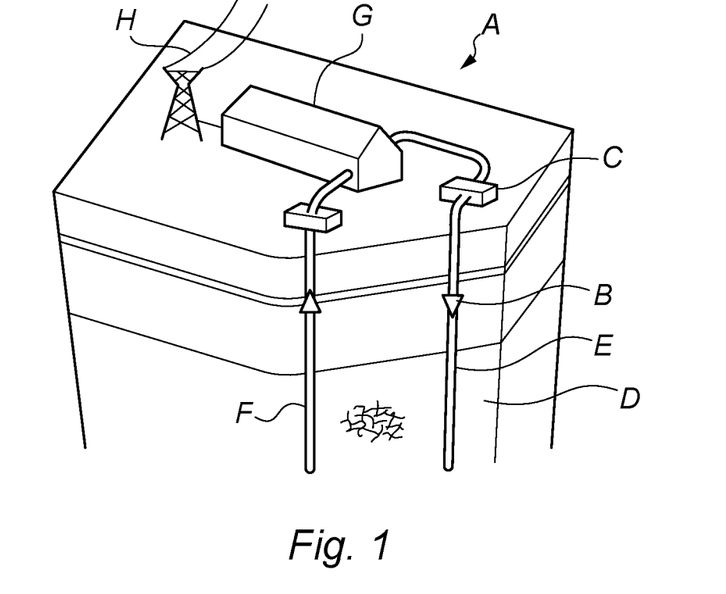
FIG. 1 is a schematic illustration of a geothermal power plant according to the prior art.

Geothermal energy production is seen as a major source of renewable energy for the future. Its development is driven by worldwide increasing demand for power and our interest in exploiting renewable, green sources of energy. Geothermal power plants have been in use for over a century and a simple schematic of a geothermal power plant A is illustrated in FIG. 1. An operating fluid B such as water is pumped down into the hot rock formations D via an injection well E where it absorbs heat energy from the fractured rock formation D. The heated operating fluid B is extracted via a production well F, spaced apart from the injection well E, and pumped to an energy conversion unit G. For electrical power generation to the grid H, the heated operating fluid is either converted to steam and expanded in a turbine, or brought in contact with a heat exchanger to heat a further fluid used to power the turbine. The turbine is coupled to a generator to generate electricity for the electrical grid H. The cooled operating fluid B is then injected with the pump C back into the geothermal reservoir D through the injection well E to sustain the process.

The efficiency of the geothermal power plant is critically dependent on the geothermal resource. Injection and production wells may be created where there is sufficient underground hot rock but insufficient or little natural permeability or operating fluid saturation in the rock. Additionally, continuous production of the hot operating fluid will cause a decrease in the enthalpy of the extracted fluid and/or a decrease in pressure over time. This can make the power plant uneconomical. In these circumstances, the wells can be stimulated by hydraulic fracturing, thermal fracturing or acidizing. The aim in the use of these techniques is to enhance natural fractures in the rock formation and create a greater network of fractures between the injection and production wells. In this way, the operating fluid contacts a greater surface area for heat transfer to occur.

There are however significant drawbacks in using stimulation techniques. These techniques rely on pumping fluids into a well, typically at a high pressure. Where natural fractures exist the fluids will enter the fractures and fill the volume of the fracture. If sufficient fluid pressure is used to shock the formation the natural fractures will dilate. Additionally, shearing occurs and the natural fractures can be made to extend in length. Fractures can also be created by generating tensile failure in the rock. Thus by their very nature these techniques can shock the formation and there is little control in creation of the fractures.

Where stimulation creates long planar fractures, there is a high risk of early 'cold' water breakthrough at the production well. The plant is then uneconomical and plugging or abandonment of the injection well is needed. Shocking the formation will change the stress distribution or the volume of the rock mass. When the rock attempts to redistribute the stress within the rock mass, it will suddenly slip or shear along pre-existing zones of weakness such as along faults or fracture networks. This large micro-seismicity can occur during stimulation and start-up causing an environmental risk. A further environmental risk is the creation of fractures which extend upwards accessing shallow aquifers.

It is an object of the present invention to provide a geothermal power plant in which control over the creation and growth of fractures is achieved.

It is a further object of the present invention to provide a method of operating a geothermal power plant in which control over the creation and growth of fractures is achieved.

According to a first aspect of the present invention there is provided a geothermal power plant, the plant comprising: an injection well and a production well, the wells being spaced apart and accessing a geothermal formation; a pump to pump operating fluid at a pump rate into the injection well for extraction as hot operating fluid from the production well; and an energy conversion unit to transfer energy from the hot operating fluid to another energy; characterised in that: the plant further comprises a downhole pressure gauge located in at least one well, means to transmit data from the downhole pressure gauge at a first sampling frequency to surface and a surface data acquisition unit wherein, the downhole pressure gauge records a change in pressure as a pressure trace, the pressure trace is transmitted as data to surface, the data is stored in the surface data acquisition unit, at least one fracture parameter is calculated from the stored data and the pump rate is adjusted based on the at least one fracture parameter.

Preferably, the fracture parameters are selected from a group comprising one or more of: fracture length, volume of fractures, lateral extension of fractures, surface fractures and estimation of global fracture network shape.

In this way, pump rate can be reduced to prevent the extension of the fracture network to protect shallow aquifers, limit micro-seismicity in the geothermal formation and reduce the risk of early 'cold' water breakthrough. Alternatively, pump rate can be increased to stimulate the well when the fracture parameter(s) indicate low risk values to grow the fracture network and hence the efficiency of the geothermal power plant. Optionally, pump rate can be maintained where no change to the fracture parameter is detected.

Preferably the downhole pressure gauge is located relative to the tubing at a level of cap rock above the geothermal formation. Where a water table exists, the downhole pressure gauge will be mounted below this. A downhole temperature gauge may also be located at in the well. Further a rate gauge or flow meter may be located in the well. These additional gauges provide supporting data for use in calculating the fracture parameter.

The pressure trace recorded can include reflections of a pressure pulse generated by the change of pressure from the tips of fractures i.e. the furthest extent of the fracture from the well. By locating the pressure gauge downhole, reflections within the well are omitted from the detected pressure trace as these occur before the pulse enters the fracture.

Preferably, the first sampling frequency is greater than 1 Hz. In this way a data point for calculations of the fracture parameters is collected every second. More preferably the first sampling frequency is between 1 and 10 Hz. The first sampling frequency may be between 10 and 100 Hz. This is a high data acquisition rate compared to prior art measurements.

Preferably, the sampling frequency can be selected by a user. In this way, the data sampling frequency can be chosen depending upon what results may be expected or the application. More preferably the sampling frequency is variable during operation. In this way, a high sampling frequency may be selected for injection operations for stimulation while a lower frequency could be used later in the life of the well when fracture length measurement is more useful.

Preferably, the downhole pressure gauge provides an analogue signal. In this way, the sampling rate is not limited by the pressure gauge used. The downhole pressure gauge may be a quartz gauge as traditionally used in the oil and gas industry. Alternatively, other pressure transducers may be adapted for use downhole e.g. strain gauges.

Preferably, the downhole pressure gauge includes a port to digitize the analogue signal. The port may comprise any analogue to digital converter. The port operates at frequencies greater than 10 Hz. The port may be programmable from surface so that the frequency may be changed to match the first sampling frequency.

Preferably, the means to transmit the data to surface is a cable. The cable may be an electrical cable as is known in the art. However, such cables are limited to 100 Hz capacity. More preferably, the cable is an encapsulated fibre optic cable. Such a cable can carry a much higher transmission rate. Alternatively the means to transmit the data to surface may be by wireless communication as is known in the art.

Preferably, the surface data acquisition unit comprises a processor and a storage facility. The storage facility may be a memory. Preferably the processor includes means to vary the sampling frequency. The means to vary the sampling frequency may select data from the signal sent from downhole which is at a higher sampling frequency than a desired sampling frequency. In this way, the amount of data stored can be limited. Additionally this allows the downhole pressure gauge and port to be pre-set before installation so that signals can be continuously transmitted to surface and no control signals need to be sent downhole. Alternatively, the means to vary the sampling frequency may send a control signal down the cable to adjust the rate of the port. The surface data acquisition unit may also comprise transmission means to transmit data to a remote site for analysis.

Preferably, the downhole pressure gauge is located in the injection well. In this way, pressure variations caused by the pump will be more distinguishable. Optionally the pump may be located at the surface of the production well and fluid pumped into the production well. In this way, the production well may be stimulated.

Preferably the change in pressure is induced in the wellbore by shut-in. Preferably, shut-in is rapid so as to cause a hammer pressure wave. In this way, the reflection of this pressure wave in the formation provides the pressure trace. Preferably, the pressure trace is treated with a fast Fourier Transform. In this way, frequency components of the Transform can be interpreted in terms of the distance of the reflector to the downhole pressure gauge, using the speed of sound in the aqueous fluid, to give distances indicative of the fracture parameters.

According to a second aspect of the present invention there is provided a method of operating a geothermal power plant, the plant comprising: an injection well and a production well, the wells being spaced apart and accessing a geothermal formation; a pump to pump operating fluid at a pump rate into the injection well for extraction as hot operating fluid from the production well; and an energy conversion unit to transfer energy from the hot operating fluid to another energy; the method comprising the steps:

(a) locating a downhole pressure gauge in at least one well;
(b) recording a change in pressure in the at least one well as a pressure trace;
(c) transmitting the pressure trace as data to surface at a first sampling frequency;
(d) storing the data in the surface data acquisition unit;
(e) calculating at least one fracture parameter from the stored data; and
(f) adjusting the pump rate based on the at least one fracture parameter.

In this way, the geothermal power plant is constantly monitoring the fracture network in the geothermal formation and adjusting the pump rate in response to measured fracture parameters.

Preferably, the fracture parameters are selected from a group comprising one or more of: fracture length, volume of fractures, lateral extension of fractures, surface fractures and estimation of global fracture network shape. In this way, pump rate can be reduced to prevent the upward extension of the fracture network to protect shallow aquifers, limit micro-seismicity in the geothermal formation by and reduce the risk of early 'cold' water breakthrough. Alternatively, pump rate can be increased to stimulate the well when the fracture parameter(s) indicate low risk values to grow the fracture network and hence the efficiency of the geothermal power plant. Optionally, pump rate can be maintained where no change to the fracture parameter is detected.

Preferably, the downhole pressure gauge is located in the injection well. In this way, pressure variations caused by the pump will be more distinguishable. Optionally the pump may be located at the surface of the production well and fluid pumped into the production well. In this way, the production well may be stimulated.

Preferably the change in pressure is induced in the wellbore by shut-in. Preferably, shut-in is rapid so as to cause a hammer pressure wave. In this way, the reflection of this pressure wave in the formation provides the pressure trace. Preferably, the pressure trace is treated with a fast Fourier Transform. In this way, frequency components of the Transform can be interpreted in terms of the distance of the reflector to the downhole pressure gauge, using the speed of sound in the aqueous fluid, to give distances indicative of the fracture parameters.

Optionally, the injection well may be stimulated. Alternatively the production well may be stimulated.

Preferably a well is stimulated by pumping an aqueous fluid into the geothermal formation. More preferably, there are a plurality of cycles of pumping the aqueous fluid with each cycle terminating in a shut-in period; the pump rate for each cycle is determined from a measurement of downhole pressure; and the process is a-seismic in that the pump rate is low to prevent shocking the formation and the temperature of the aqueous fluid is low to induce tensile failure in the rock and thereby provide a fracture network of very high conductivity fractures and high conductivity fractures with sufficient lateral extension for efficient heat transfer. In this way, a proppant is not required. Additionally, micro-seismicity is decreased by spreading it over time.

In this way, each aqueous fluid injection cycle will induce fractures on the surfaces of the existing fractures and thus laterally extend the network. As the induced fractures are formed from existing fractures the resultant network has high conductivity. Very high conductivity fractures lie around the well, are the main conduit of permeability, effectively increasing the contact surface for heat transfer. Extending from the very high conductivity fractures are high conductivity fractures which provide increased lateral extension, and though they may partly close when stimulation is complete, will still contribute to the heat transfer to the operating fluid feeding the very high conductivity fractures. Of note, however, is the 'fractal-like' or 'man-made' nature of the fractures created. These are man-made by virtue of the shut-in period followed by injection of cooler aqueous fluid, there being a thermal component of stress working along the fracture boundary which weakens it, so allowing further fractures to be formed. This is in contrast to the prior art use of shear failure which occurs on existing and incipient fractures to open them.

Preferably, the pump rate for the aqueous fluid is less than 15 bpm (barrels per minute). The pump rate may be less than 10 bpm. The pump rate may be in the range 4 to 15 bpm. For one or more cycles the pump rate may be less than 2 bpm. More preferably, the pump rate is less than 1 bpm. The pump rate may vary in each cycle. In this way, the formation does not encounter shock on pumping the aqueous fluid. Pump rates for traditional hydraulic fracturing in hydrocarbon wells are typically in the range of 50 to 200 bpm as it is intended to shock the formation to open up the fractures. Advantageously, the low pump rate is equivalent to pumping from 1 or 2 high pressure pumps as compared to the 30 to 50 typically needed for traditional hydraulic fracturing in hydrocarbon wells. The pump rate for the aqueous fluid may be high i.e. more typical of the 50 to 200 bpm of traditional hydraulic fracturing in hydrocarbon wells. This higher rate speeds up the final cycle.

Preferably, the temperature of the aqueous fluid is sufficient to create the thermal stress required to form new fractures. The aqueous fluid may be cooled before pumping. This cooling may be achieved by leaving the aqueous fluid for a period of time prior to pumping. Such an approach is required if the aqueous fluid has been taken from the energy conversion unit. Preferably, the temperature of the aqueous fluid is lower than a temperature of the geothermal formation at the location where the fluid enters the formation from the wellbore. Consequential heating of the aqueous fluid as it is pumped to the entry area may be accounted for in determining the temperature of the aqueous fluid. More preferably a downhole temperature gauge is used to determine temperature at the interval.

Preferably the pump rate for pumping the aqueous fluid, pumping duration, pressure and shut-in period duration for each cycle are determined from analysis of fracture parameters calculated from previous cycles.

Preferably, all the fracture parameters are calculated after each pumping cycle of the aqueous fluid.

Preferably, the downhole pressure is measured using a downhole pressure gauge located in the well wherein the downhole pressure gauge has a data collection rate of at least 1 Hz. In this way a data point for calculations of the fracture parameters collected every second. More preferably, the data collection rate is between 1 and 10 Hz. The data collection rate may be between 10 and 100 Hz. This is a high data acquisition rate compared to prior art measurements.

As most gauges are now digital, such data collection rates are available but not used on the basis of the excessive quantity of data which would be collected over the time scales typically used in the industry.

Preferably, at shut-in, the pump rate is reduced in a step-wise manner. More preferably, the pump rate at a final step prior to final shut-in is less than 2 bpm. Preferably each step is completed in around 1 to 5 minutes.

Preferably at a start of each cycle, the pump rate of aqueous fluid is less than 2 bpm. More preferably the pump rate of aqueous fluid is in the range of 0.5 to 2 bpm.

Preferably the aqueous fluid is water. More preferably the aqueous fluid is the operating fluid. The aqueous fluid may be seawater. In this way, the aqueous fluid may be whatever is available at the well and thus freshwater does not have to be brought to the well. Preferably the aqueous fluid contains no chemical additives to adjust the viscosity. This reduces cost and time in making aqueous fluid solutions. Advantageously, a proppant is not used which also reduces time and cost. The aqueous fluid may contain a bactericide to prevent souring as is known in the oil and gas industry.

Accordingly, the drawings and description are to be regarded as illustrative in nature and not as restrictive. Furthermore, the terminology and phraseology used herein is solely used for descriptive purposes and should not be construed as limiting in scope languages such as including, comprising, having, containing or involving and variations thereof is intended to be broad and encompass the subject matter listed thereafter, equivalents and additional subject matter not recited and is not intended to exclude other additives, components, integers or steps. Likewise, the term comprising, is considered synonymous with the terms including or containing for applicable legal purposes. Any discussion of documents, acts, materials, devices, articles and the like is included in the specification solely for the purpose of providing a context for the present invention. It is not suggested or represented that any or all of these matters form part of the prior art based on a common general knowledge in the field relevant to the present invention. All numerical values in the disclosure are understood as being modified by "about". All singular forms of elements or any other components described herein are understood to include plural forms thereof and vice versa.

While the specification will refer to up and down along with uppermost and lowermost, these are to be understood as relative terms in relation to a wellbore and that the inclination of the wellbore, although shown vertically in some Figures, may be inclined.

Embodiments of the present invention will now be described, by way of example only, with reference to the accompanying Figures, of which:

FIG. 3 is a graph of a pressure trace showing downhole pressure versus time at shut-in;

FIG. 7(a) is a schematic illustration of thermal stresses in a fracture during shut-in and FIG. 7(b) is a corresponding graph illustrating the thermal stresses during shut-in;

Figure 2:
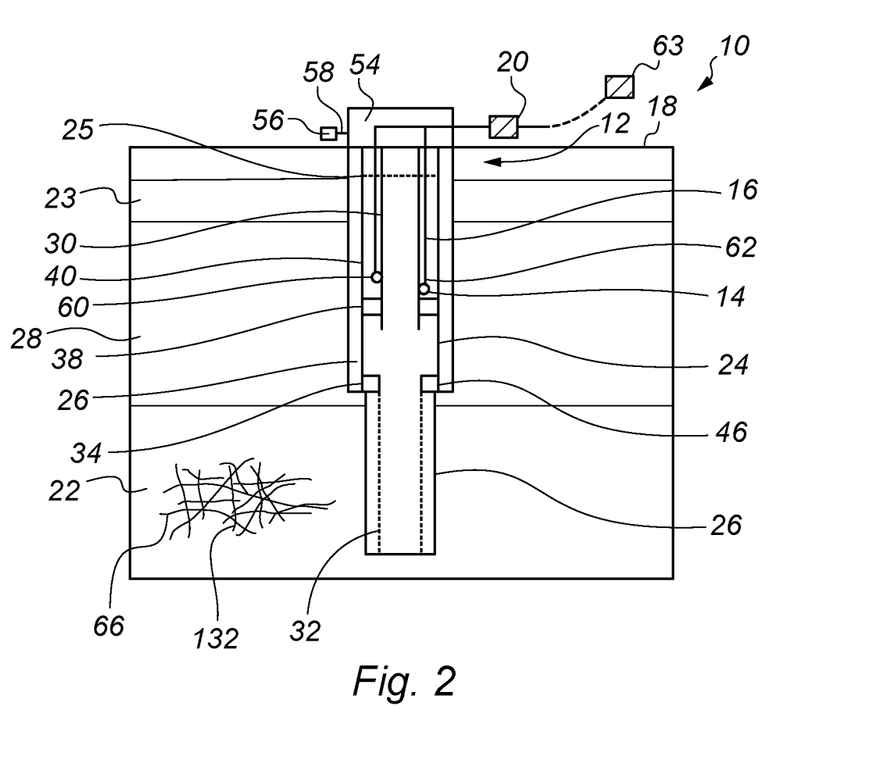
FIG. 2 is a schematic illustration of a well of a geothermal power plant according to the present invention.

Referring initially to FIG. 2, there is shown a simplified illustration of a well in a geothermal power plant, generally indicated by reference numeral 10, of the arrangement shown in FIG. 1.

Within the well 12 there is a downhole pressure gauge 14, a cable 16 to transmit data from the downhole pressure gauge 14 to surface 18 and a surface data acquisition unit 20.

Well 12 is drilled in the traditional manner providing a casing 24 to support the borehole 26 through a majority of the cap rock 28 to the location of the geothermal formation 22 which may be referred to as hot rock. This will be below the any shallow aquifer 23 which may be present and its equivalent water table 25. Standard techniques known to those skilled in the art will have been used to identify the location of the geothermal formation 22 and to determine properties of the well 12.

The casing 24 is cemented in place between the casing 24 and the borehole wall 46. The borehole 26 is continued into the geothermal formation 22 with the borehole wall 46 now accessible via a slotted or perforated liner 32 which is supported from a liner hanger 34 at the bottom of the casing 24. Shallow tubing 30 is run into the casing 24 with a production packer 38 providing a seal between the tubing 30 and the casing 24, preventing the passage of fluids through the annulus 40 there-between.

At surface 18, there is a standard wellhead 54. Wellhead 54 provides a conduit 58 for the entry or exit of fluid from the well 12 which may be via a pump 56. Wellhead gauges may be located on the wellhead 54 but for this embodiment the temperature gauge is combined with the pressure gauge 14 and a rate gauge or flowmeter 60 are located in the well 12 at a position below the water table 25 and within the temperature range of usual oilfield equipment.

Downhole pressure gauges 14 are known in the industry and are run from unit 20 at surface 18, to above the production packer 38. The downhole pressure gauge 14 typically combines a downhole temperature and pressure gauge. The gauge 14 is mounted in a side pocket mandrel in the tubing 30. Data is transferred via a high capacity cable 16 located in the annulus 40. The gauge 14 may be a standard gauge though, for the present invention, the gauge 14 must be able to record downhole pressure data at a high acquisition rate. A quartz gauge can achieve this. The signal is recorded as an analogue signal and a port 62 provides an analogue to digital converter set at the desired acquisition rate. This acquisition rate can be considered as a sampling frequency. The sampling frequency can be set before the gauge 14 and port 62 are installed in the well 12 or a control signal can be sent from the unit 20 to the port 62 via the cable 16, to change the sampling frequency.

For the present invention, the sampling frequency must be greater than 10 Hz. Current downhole pressure gauges used in hydrocarbon producing wells do not measure at sampling frequencies greater than 10 Hz. Retrievable memory gauges exist which provide a temperature and pressure gauge on a wireline which is run into the well 12 and recorded data stored in an on-board memory to be analysed later when the gauges are retrieved. The memory gauge sampling capacity is up to 10 Hz but more often 1 Hz is used as faster responses are not expected to be needed and memory storage capacity is limited. Permanent downhole pressure gauges also exist although these are primarily used to measure pressure response to fluid flow in hydrocarbon production wells. This is a quasi-static problem which does not vary very rapidly and thus sampling rates of less than 10 Hz and more typically less than 0.2 Hz are sufficient.

As the present invention wishes to measure the extent of fracturing, any frequency less than 10 Hz would be insufficient as at 10 Hz the wavelength of a pulse through water (assuming the operating fluid is water) is 144 m (velocity of a pressure wave through water is approximately 1440 m/s). If we consider that a fracture tip is a stiff reflector and that a pulse will travel through the fracture, be reflected at the tip and travel back to the pressure gauge 14 for recordal, this reflected signal is an indication of the time taken for a wave to travel from its source to the reflector and back. Simple theory states that this time t=2D/V, were D is the distance to the reflector and V is the velocity of propagation of a pressure wave through a fluid. With V taken as approximately 1440 m/s, D will then provide the length of a fracture. As the sampling rate needs to be around ten times higher than the distance being measured to provide sufficient resolution, a 10 Hz sampling rate would only be useful to detect distances of around 1 km. In the prior art, such a sampling rate used at a pressure gauge at the wellhead was sufficient to detect the reflection from the bottom of the borehole. However, for a downhole gauge, the fractures would have to be 1 km in length before they were detected.

The sampling frequency is therefore selected to be 100 Hz or greater in an embodiment. This would measure fracture lengths around 70 to 100 m. In a further embodiment, the sampling frequency is 1 kHz or greater. This sampling rate detects fracture lengths of around 7 to 10 m.

Quartz pressure gauges exist which can be adapted for downhole use and provide the required signal detection rate. Other types of pressure gauges such as strain gauges could also be adapted for downhole use. The port 62 is an electronic PC board/microchip and such analogue to digital converters, at the desired sampling frequencies, are readily available in other technical fields. These can be adapted to operate downhole although operation at downhole temperatures needs consideration. Programmable analogue to digital converters are also available.

Traditional electric cables 16 are used to carry data from downhole to surface have a capacity of around 100 Hz. Other cables, such as encapsulated fibre optic, are now available which have a much higher data transmission rate. Alternatively, wireless telemetry systems could be used as long as they provide the data carrying capacity required.

At surface 18, the data is transferred to a data acquisition unit 20. The unit 20 can control multiple gauges used on the well 12. The unit 20 can also be used to coordinate when pressure traces are recorded on the gauge 14 to coincide with an injection operation by, for example, having control of pumps 56 or by detecting a change in rate at the flowmeter 60. Unit 20 will include a processor and a memory storage facility. Unit 20 will also have a transmitter and receiver so that control signals can be sent to the unit 20 from a remote control unit 63. Thus the data can be analysed remotely.

In use, the downhole pressure gauge 14 and port 62 are installed in a well 12 of a geothermal power plant 10. The downhole pressure gauge 14 is connected with the port 62 to surface 18, by a cable 16. These are permanent installations, preferably installed when the well 12 is completed. At surface 18, the cable 16 is connected to a data acquisition unit 20.

The downhole pressure gauge 14 will record a change in pressure. In order to measure a fracture parameter it is easiest to induce a pressure change in the borehole 26. This can be by making a sudden increase in the pump rate to provide a pressure pulse or by shutting in the well i.e. quickly stopping the pumps. At shut-in the downhole pressure gauge 14 is continuously recording and the port 62 is preferably set to a high sampling frequency i.e. 1 kHz or greater. If the shut-in is done quickly, the graph of downhole pressure against time i.e. the pressure trace will show a water hammer pressure wave with peaks and troughs illustrating the reflections of the water hammer pressure wave from stiff reflectors in the geothermal formation 22. If the shut-in is slow then the hammer wave will be too truncated.

Figure 3:
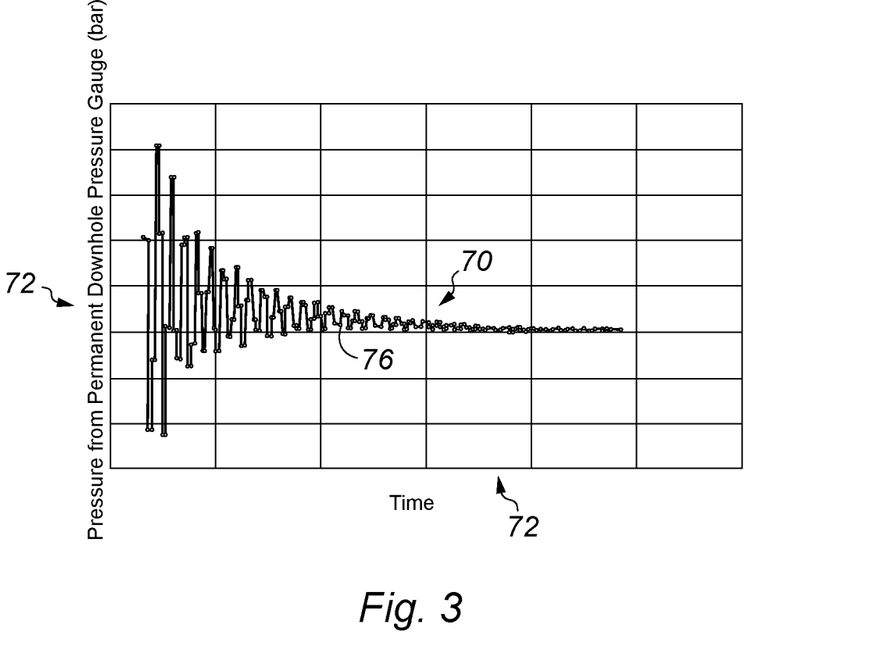

Reference is now made to FIG. 3 of the drawings which illustrates a pressure trace 70, recording downhole pressure 72 against time 74. Trace 70 is a characteristic decaying wave of peaks and troughs. The sampling frequency determines the number of data points on the graph and thus the resolution of the peaks and troughs. This wave 76 can be considered in the same way as a sound wave in active sonar. At shut-in, the 'ping' is created and the measured pressure trace represents the echo formed by reflections. By treating the wave 76 with a fast Fourier Transform, frequency components of the Transform can be identified.

Figure 4:
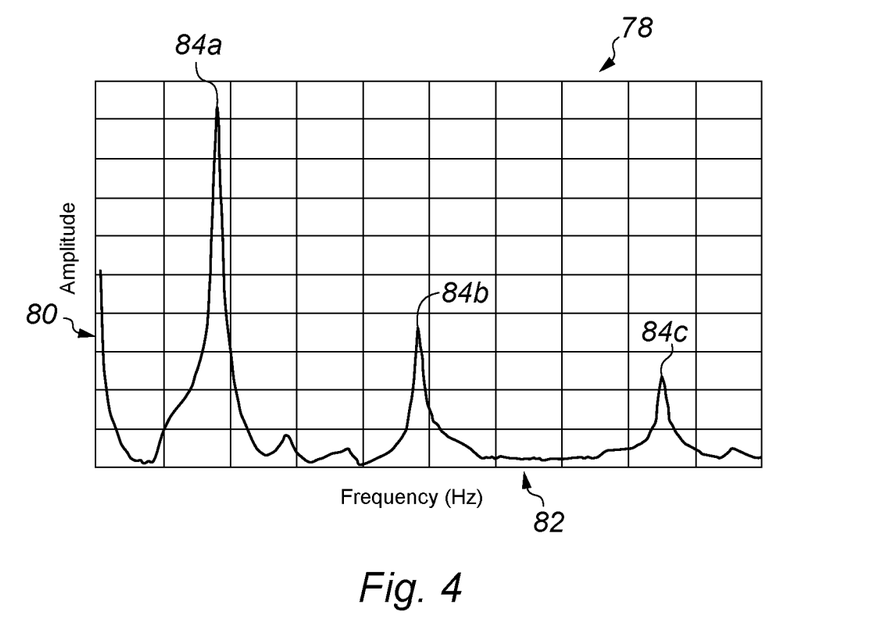
FIG. 4 is a Fourier Transform of the graph of FIG. 3 illustrating signals indicative of reflectors at distances from the wellbore.

FIG. 4, shows a Fourier Transform 78 of the wave 76 of FIG. 3. FIG. 4 is a Fourier spectral analysis providing amplitude 80 against frequency 82. The transform 78 shows three peaks 84a-c. Each peak 84 represents a reflection from a stiff reflector in the formation. This will be considered to be a reflection from the tip of a fracture 66. The frequency of each peak 84, provides a distance D, to the reflector by use of the equation, $1/f=4D/V$, were f is the frequency and V is the velocity of propagation of a pressure wave through a fluid. Here we use V as approximately 1440 m/s, being the velocity of a pressure wave through water, D will then provide the length of a fracture. Each peak 84a-c therefore correlates to a length of a fracture. The longest fracture lengths can then be considered to indicate the extent of fracturing in the well 12.

Thus a fracture parameter, notably a maximum length of fracture has been calculated. Consequently, this can be compared to the distance between the well and the distance to any identified shallow aquifer. Accordingly, if the calculated fracture parameter indicates a high risk of early cold water breakthrough and/or access to an aquifer, the pump rate of the operating fluid into the injection well can be lowered so as to reduce the possibility of extending or creating new fractures. The frequency of fracture parameter measurement should also be increased so as to monitor the fracture parameter to ensure that the reduction in pump rate has reduced the creation or growth of fractures.

Figure 5:
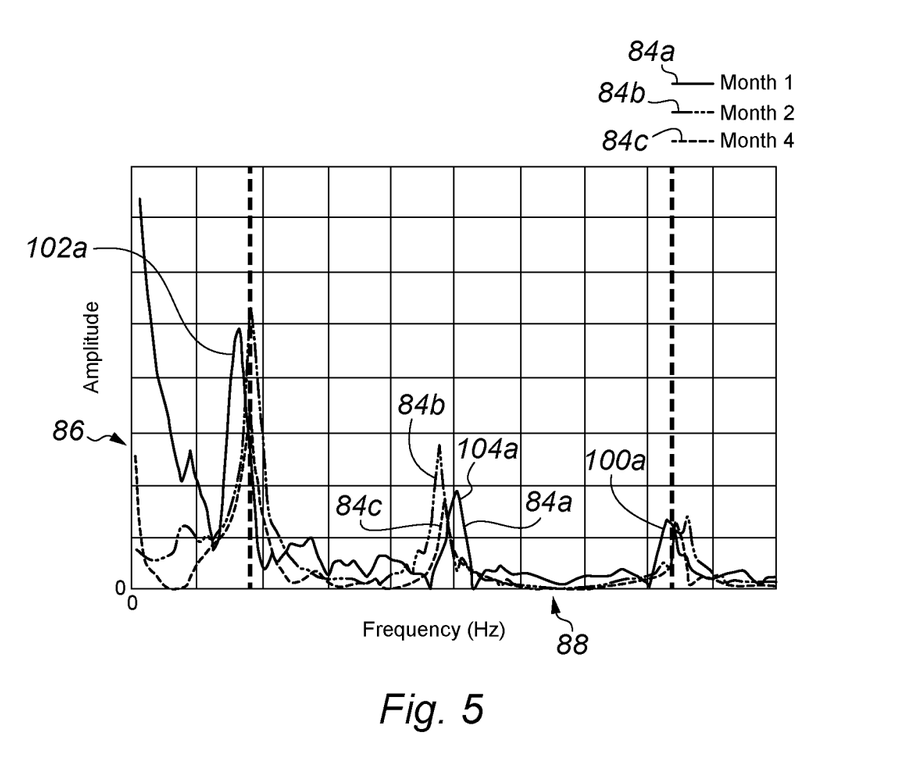
FIG. 5 is a graph of the Fourier Transform of pressure traces recorded over a period of months, taken from a wellbore.

Referring now to FIG. 5 of the drawings there is illustrated three plots of Fourier Transforms 84a-c of amplitude 86 versus frequency 88, for the same well at different time periods to show monitoring of the fracture length measurement in a well over time. Plot 84a is the Fourier Transform of a pressure trace from an initial shut-in, considered as Month 1. The plot 84a provides limitations at each end of the graph. At the highest frequencies, shortest distances, we see a peak 100a, which represents the distance from the downhole pressure gauge 14 to the borehole wall 44, which are the first reflectors. At the lower frequencies at the start of the plot 84a, the peak 102a represents a reflection from the bottom of the well and which corresponds to the well length. Peaks 104a between peaks 100a and 102a are from reflections in the geothermal formation 22 indicating fractures 66, whose length can be calculated. If the data had been acquired at a higher frequency, we would see a greater number of peaks 104a between the outer peaks 100a and 102a.

Shut-in was repeated a month later and plot 84b is the resulting Fourier Transform of the pressure trace. The peaks are still present and any variation in amplitude is likely due to the resolution of data acquisition which was not high. After a four month period, the measurement was made again and plot 84c produced. Again the peaks are present and the Figure shows good reproducibility and a potential to determine if fracture length increases across each time period. The peaks 100,102 representing well length and distance to entry points through the slotted or perforated liner which may be used to add confidence to the measurements or provide a calibration, on which the sampling frequency can be selected.

Alternatively, if the calculated fracture parameter indicates a very low risk of early cold water breakthrough and/or access to an aquifer the efficiency of the geothermal power plant can be considered and a decision to undertake well stimulation may be made in the knowledge that there will be a low risk of early cold water breakthrough and/or access to an aquifer.

The downhole pressure gauge 14 is permanently mounted in the well and fracture length measurements can be made at any time. This provides the opportunity to monitored fracture length parameters in near real-time. Additionally, only a small amount of fluid is required to be injected into a well at the increased pump rate to provide a hammer pressure wave on shut-in, so a measurement can be made while the operating fluid is circulating through the wells and the geothermal power plant 10 is operational.

Stimulation of the injection or production well may happen early in the life of the plant if the flanks of the geothermal formation do not contain natural fractures and the injection wells need to be fractured or it may occur later after the "good" injection wells have broken through to the producing wells, leading to "cold" water production. If stimulation of the injection or production well is decided upon, an embodiment of the present invention provides for a method which limits the micro-seismicity by spreading it over time and reduces the risk of accessing a shallow aquifer. Now referring to FIG. 6, there is illustrated a methodology, generally indicated by reference numeral 101, in the form of a graph of pump or injection rate 121 against time 141 for creating a fracture network 161 of high and very high conductivity fractures 181,201 providing lateral extension in the geothermal formation 22 around the well 12.

Figure 6:
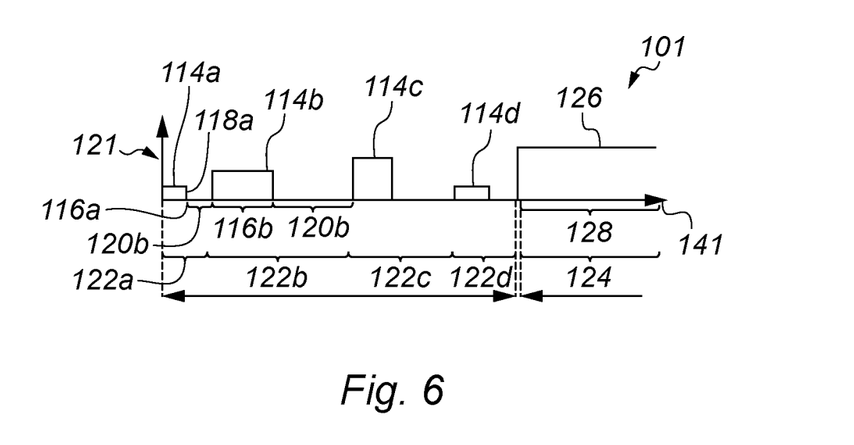
FIG. 6 is a graph of a methodology for stimulating a well of a geothermal power plant according to an embodiment of the present invention.

With the well 12 prepared as detailed in FIG. 2, the stimulation method 101 of an embodiment of the present invention can be implemented. Returning to FIG. 6, an aqueous fluid 64 is injected at a first injection rate/pump rate 114a, for a duration 116a and then the well 22 is shut-in 118a for a period 120a. This is considered as a cycle 122a. Further cycles 122b-d with potentially differing injection rates 114b-d, durations 116b-d and shut-in periods 120b-d follow. The method 101 ends with pumping the operating fluid through the injection well again 124. The operating fluid/aqueous fluid 64 is injected at a rate 126 continuously to generate the energy for the plant 10. Though the method 101 on FIG. 6 shows four aqueous fluid 64 injection cycles 122a-d, the number required will be dependent on an analysis of the data collected from previous cycles 122.

The aqueous fluid 64 is cooled. By this we mean that the temperature of the injected fluid at shut-in must be lower than the formation temperature to provide a temperature differential and induce thermal stress. Such cooling can be achieved by having a lag time before injecting the water output from the energy conversion unit in the geothermal power plant 10. The water may also be treated with bactericide to avoid souring of the formations by bacteria.

Figure 7A:
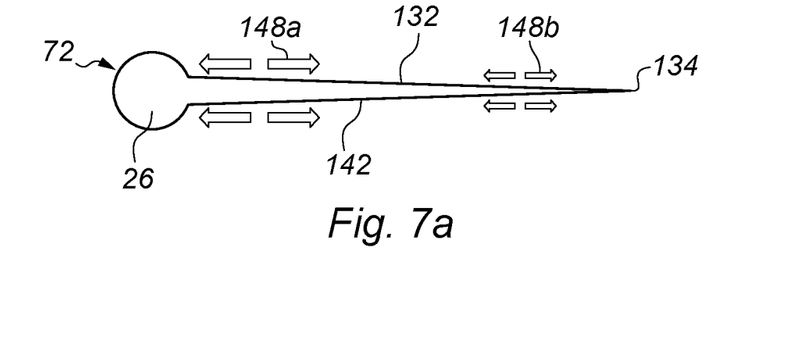
Figure 7B:
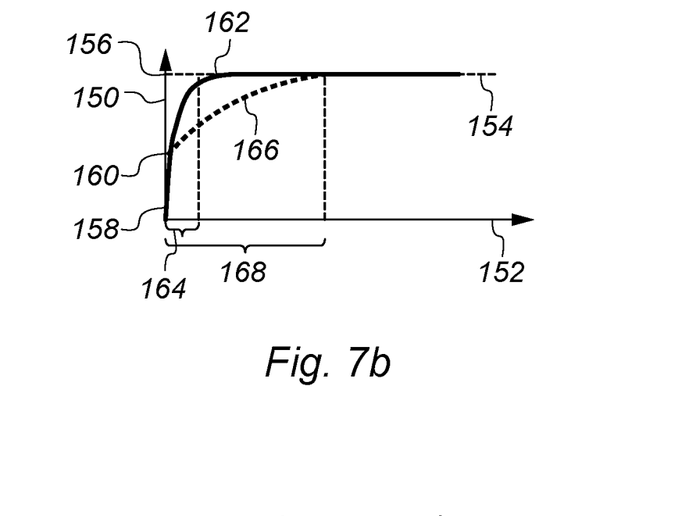

Referring to FIG. 7(*a*), there is an illustration of what occurs when the aqueous fluid 64 is injected into the geothermal formation 22. The fluid 64 enters the well 12 by being pumped through the borehole 26. At shut-in 118, thermal stresses 148 will act on the fractures 132 as illustrated in FIG. 7(*a*). Larger thermal stresses 148*a* act along the wall 142 nearest the borehole 26 as the fluid 64 here is cooler at shut-in than the warmer fluid near the tip 134 where smaller thermal stresses 148*b* occur. The thermal stresses 148 represent a thermal component of stress which works along the fracture wall 142 i.e. fracture boundary, which weakens it, so allowing fractures to be formed orthogonally to the fracture wall 142. FIG. 7(*b*) gives a graphical illustration of what temperature changes are occurring in the formation 22 at the fracture 132. Considering temperature 150 versus distance 152 from the fracture 132 (orthogonal), we have a formation or virgin temperature 154 which is given as a constant value 156. As the fluid 64 is cooled, the temperature 150 at the fracture 132 will be at a value 158 much lower than the virgin temperature value 156 at shut-in. However, the temperature profile at shut-in rises to the virgin temperature 156 over a short distance 164 from the fracture 132. The thermal stresses 148 at shut-in may be considered as 'early shallow' stresses. By leaving the well 12 shut-in for a period 120, the temperature profile moving from the fracture 132 will change. The resulting profile at the end of shut-in 166, shows a temperature value 160 at the fracture 132 which is between the temperature value 158 at shut-in and the virgin temperature 156. The profile 166 is then shallower taking a further distance 168 from the fracture 132 to reach the virgin temperature 156. Thus there is now 'late deep' thermal stresses 148 induced which cause the creation of fractures orthogonal to the wall 142 of the fracture 132.

As tensile failure of the formation 22 is achieved with low injection rates 114 the method 101 is essentially a-seismic. This means that the method 101 creates fractures which are not recordable by seismic arrays, such tilt meters and the like being the common techniques for measuring fractures. Thus the method 101 of an embodiment of the present invention can be used where natural fractures do not exist. The method 101 can create fractures and, more particularly, a fracture network 161 which is nearly entirely 'man-made'.

Figure 8:
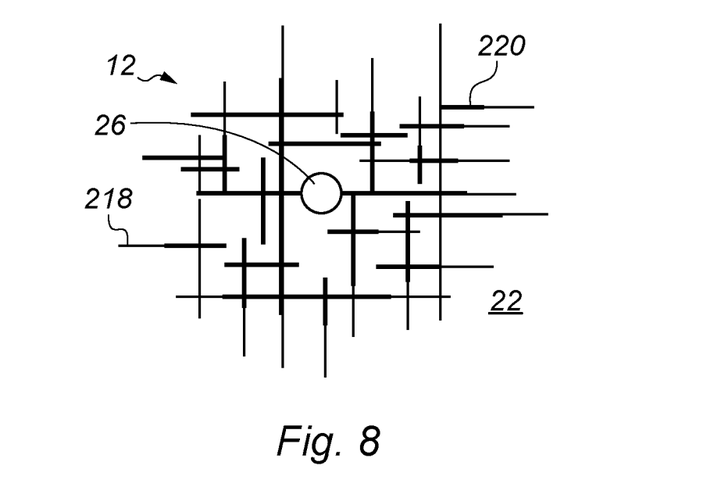
FIG. 8 is a schematic illustration of a fracture network around a well according to an embodiment of the present invention.

The resulting fracture network 161 is illustrated in FIG. 8. From the borehole 26 there is seen a network of very high conductivity fractures 220 which have been created by subsequent injection cycles 122. The fractures 218 appear orthogonal to each other, showing creation by tensile failure due to thermal stress along a fracture surface compared to the random pattern as would be seen by natural and incipient fracture networks. Emanating from the very high conductivity fractures 220 are high conductivity fractures 218. The thermal stresses 148 show a highly dense network 161 of fractures 220,218 close to the borehole 26 whose denseness reduces as you move away from the borehole 26. In some cases there appears to be three zones of permeability centred at the borehole 26. During the geothermal process, the very high conductivity fractures 220 are the main conduit of permeability. The high conductivity fractures 218 of the injection cycles 122, are now low conductivity fractures which will partly close but still contribute to heat transfer of the operating fluid.

For each injection cycle 122*b-d*, it is advantageous to determine a number of fracture parameters in order to assist in the selection of the injection rate of each injection cycle 122, the duration of injection 116, and the duration of each shut-in period 120. The fracture parameters which are determined after each injection cycle of aqueous fluid 122 are:

(a) The volume of very high conductivity fractures;
(b) The lateral extension of the very high conductivity fractures;
(c) The surface of the very high conductivity fractures; and
(d) The estimation of the global fracture network shape.

Figure 9:
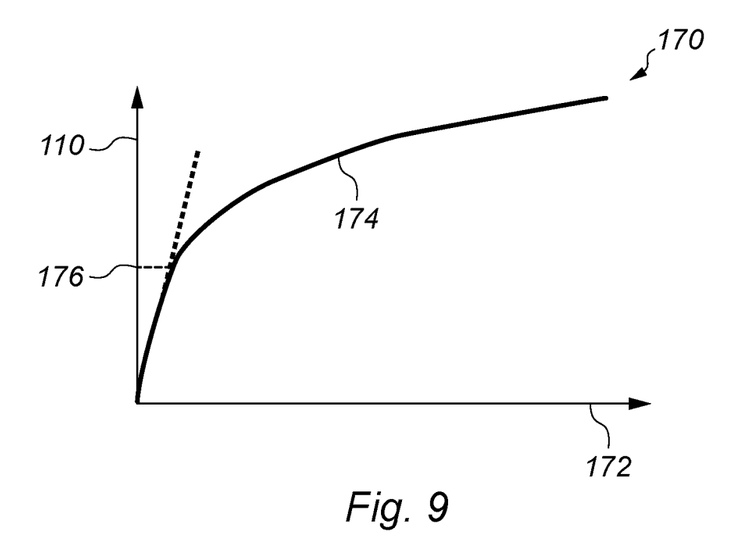
FIG. 9 is a graph of downhole pressure versus injected volume analysed to determine the volume of very high conductivity fractures according to an embodiment of the present invention.

Reference is now made to FIG. 9 which shows a graph 170 used to determine the volume of the very high conductivity fractures. Graph 170 shows the measured downhole pressure 110 against injected volume 172 at the start of a cycle 122. This shows a curve 174 which rises sharply in a straight line at a fixed gradient before tailing off towards the horizontal. The point 176 that the curve 174 tails off reflects a reduction in downhole pressure caused by the creation of one or more fractures. Point 176 may be referred to as the Leak-Off Pressure (PLOT). Those skilled in the art will recognise that the fixed gradient at point 176 is equivalent to the volume by use of the compressibility equation. Such an equation is known to those skilled in the art. In order for these measurements to be made, the injection rate 114 of aqueous fluid 64 is in the range of 0.5 to 2 bpm and the data collection rate of the downhole pressure gauge is between 1 and 10 Hz at the start of the cycle 122.

Figure 10:
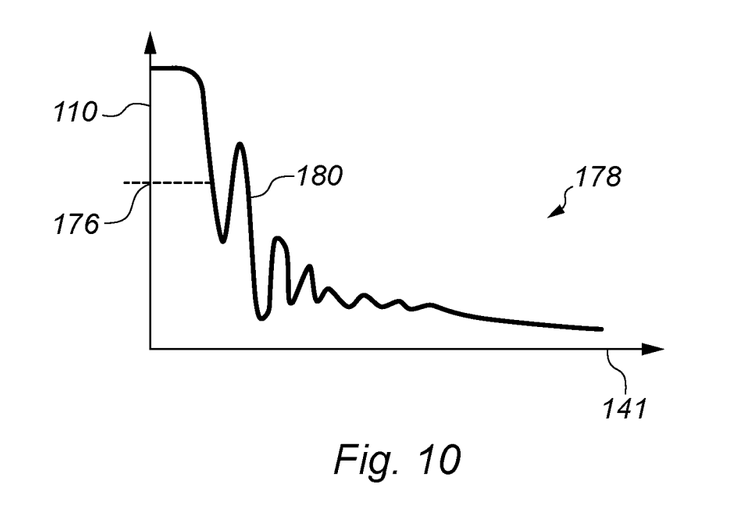
FIG. 10 is a graph of downhole pressure versus time analysed to determine the lateral extension of very high conductivity fractures according to an embodiment of the present invention.

Reference is now made to FIG. 10 of the drawings which shows a graph 178 used to determine the lateral extension of the very high conductivity fractures. Graph 178 shows downhole pressure 110 against time 141 at shut-in 118. The injection rate 114 of aqueous fluid 64 is in the range of 1 to 2 bpm and the data collection rate of the downhole pressure gauge is between 10 and 100 Hz at shut-in 118 of each cycle 122, or at least for the first minute. If the shut-in is done quickly, the graph 178 will show a water hammer pressure wave 180 with peaks and troughs illustrating the reflections of the water hammer pressure wave from stiff reflectors in the well 22 and the formation 36. If the shut-in is slow then the hammer wave 180 will be too truncated. This wave 180 can be considered in the same way as the sound wave in seismic. By treating the wave 180 with a fast Fourier Transform, frequency components of the Transform can be interpreted in terms of the distance of the reflector to the downhole pressure gauge, using the speed of sound in the aqueous fluid, to give distances equivalent to the lateral extension of the very high conductivity fractures. The lateral extension gives an indication of the risk of possible early cold water breakthrough or for accessing an aquifer.

Figure 11:
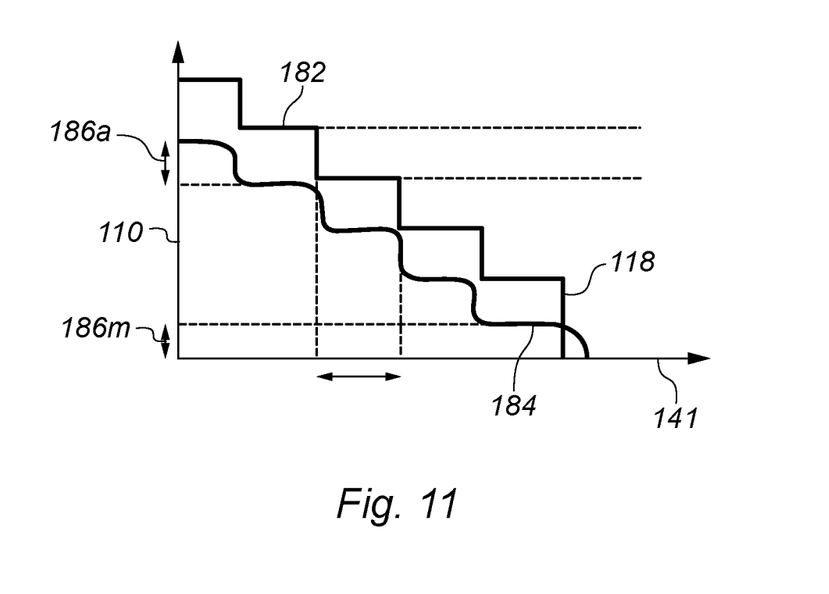
FIG. 11 is an illustrative graph of downhole pressure and injection rate versus time used to determine differences in friction loss for the calculation of the surface of very high conductivity fractures according to an embodiment of the present invention.
Figure 12:
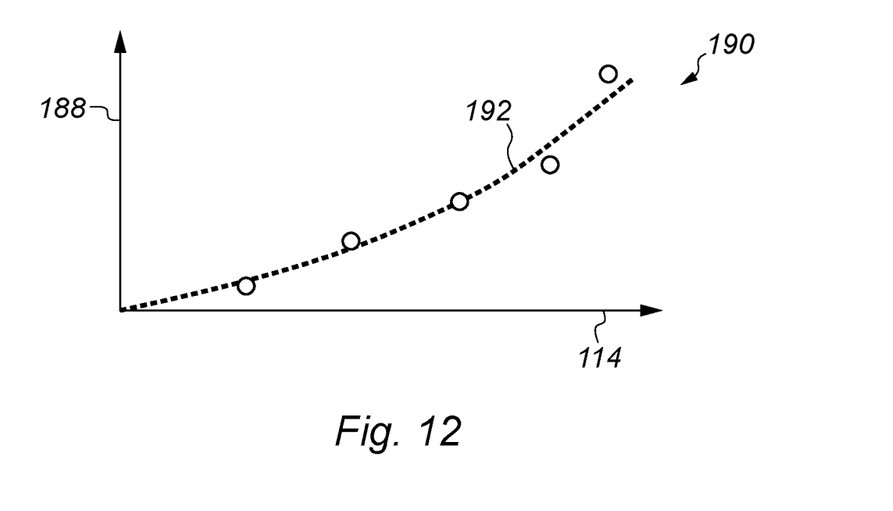
FIG. 12 is a graph of friction loss versus injection rate with a polynomial best fit analysed to determine the surface of the very high conductivity fractures according to an embodiment of the present invention.

We next require a determination of the surface of the very high conductivity fractures. The larger the surface, the more fractures can be created by thermal stress. To achieve this, the shut-in 118 is conducted in a step-wise manner. After the duration 116 of injected aqueous fluid 64, the injection rate 114 is reduced in steps of around 1 bpm with step durations of 1 to 5 minutes. The data acquisition frequency is set between 1 and 10 Hz. The last step to stop injecting is what is used for obtaining the hammer wave 180, in FIG. 10. The steps of the injection rate 182 are illustrated on FIG. 11, to match the steps occurring in the downhole pressure 110 with time 141, resulting from the step-wise shut-in. The curve 184 is used to determine the pressure difference 186 across two steps of rate. A calculation of friction loss 188 is then made to provide a friction loss 188 versus injection rate plot 190. Plot 190 is illustrated in FIG. 12. A polynomial best fit curve 192 is calculated. Knowing the volume of very high conductivity fractures 20, FIG. 9, and their approximate shape, FIG. 10, the polynomial best fit curve 192 is used to derive, the number of very high conductivity fractures 220 and the surface area between the fracture network 161 and the rock matrix in the formation 22. By maximising this value the greatest heat transfer between the geothermal formation 22 and the operating fluid can be achieved. This will provide the biggest efficiency for the geothermal power plant 10.

Figure 13:
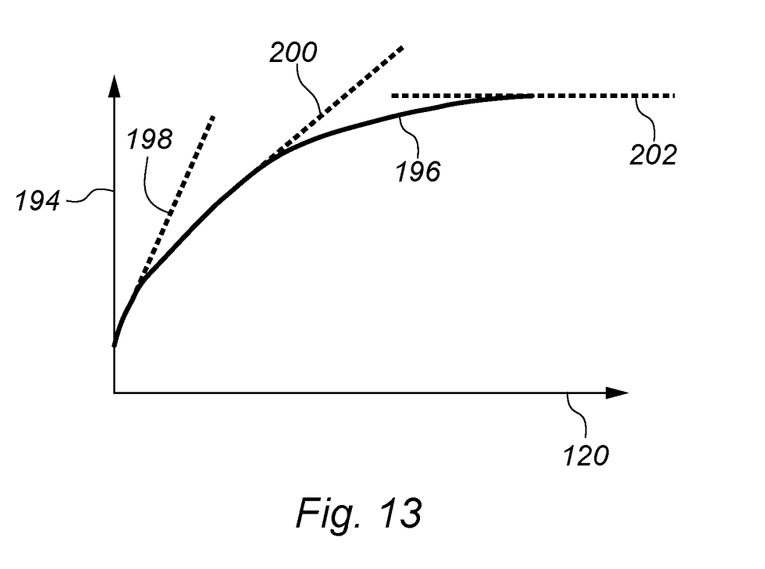
FIG. 13 is a graph providing a characteristic curve which can be analysed to give qualitative assessment of the fracture network geometry.

The estimation of the global fracture network shape is qualified by establishing a characteristic curve for each shut-in 118. Preferably the shape is followed up in real-time after each injection cycle. A semi-log derivative of downhole pressure 110, is plotted against shut-in time 120, with the derivative 194. A characteristic curve 196 is illustrated in FIG. 13. Preferably the curve provides three slopes 198,200, 202, with the duration of each slope indicating a duration of pressure diffusion. The first slope 198 at shut-in indicates pressure diffusion in a planar fracture; the second slope 200 indicates pressure diffusion in a planar fracture and in orthogonal fractures; and, the third slope 202 indicates pressure diffusion in a "pseudo" isotropic fracture network. On completion of each cycle 122*a-c*, the characteristic curve 196 is analysed, and the injection rate 114, injection duration 116 and shut-in period 120 are adapted for the subsequent injection cycle 122*b-d*, to modify the next characteristic curve. The aim being to minimize the duration of the initial two slopes 198,200 on subsequent cycles 122 of injecting the aqueous fluid 64 so that the largest pressure diffusion is across the ideal pseudo isotropic fracture network 161 that has been formed.

While stimulation has been primarily described for an injection well one can consider stimulating a production well, which is not producing because it has not crossed (enough) conductive natural fractures. In the latter case, the stimulation may be short, just to ensure communication with natural fractures. However the technique, which is describe herein may still have an application, as it will propagate fractures in multiple directions and is more likely to intercept natural fractures than a single planar fracture.

The principle advantage of the present invention is that it provides a a geothermal power plant in which control over the creation and growth of fractures is achieved by measuring fracture parameters and adjusting the pump rate.

A further advantage of the present invention is that it provides a method of operating a geothermal power plant in which control over the creation and growth of fractures is achieved by measuring fracture parameters and adjusting the pump rate.

A yet further advantage of the present invention is that it provides a method of stimulating a well of a geothermal power plant which protects shallow aquifers, limits microseismicity in the geothermal formation and reduces the risk of early 'cold' water breakthrough.

Modifications may be made to the invention herein described without departing from the scope thereof. For example, it will be appreciated that some Figures are shown in an idealised form and that further interpretation of the graphs may be required. The velocity of propagation of a pressure wave in water has been estimated as 1440 m/s. Formulae exist to account for the elasticity of the medium containing the water which reduces this velocity. Such formulae could be used to provide a more complex model to calculate the extent of fracturing.

The invention claimed is:

1. A geothermal power plant, the plant comprising:
an injection well and a production well, the wells being spaced apart and accessing a geothermal formation; a pump to pump operating fluid at a pump pressure into the injection well for extraction as hot operating fluid from the production well; and an energy conversion unit to transfer energy from the hot operating fluid to another energy;
the plant further comprises a downhole pressure gauge located in at least one well, means to transmit data from the downhole pressure gauge at a first sampling frequency to surface and a surface data acquisition unit wherein, the downhole pressure gauge records a change in pressure as a pressure trace, the pressure trace is transmitted as data to surface, the data is stored in the surface data acquisition unit, at least one fracture parameter is calculated from the stored data and the pump rate is adjusted based on the at least one fracture parameter; and wherein the downhole pressure gauge is a quartz gauge providing an analogue signal and the geothermal power plant includes a port to digitize the analogue signal, the port comprises an analogue to digital converter and the port operates at frequencies greater than 10 Hz.

2. A geothermal power plant according to claim 1 wherein the fracture parameters are selected from a group comprising one or more of: fracture length, volume of fractures, lateral extension of fractures, surface fractures and estimation of global fracture network shape.

3. A geothermal power plant according to claim 1 wherein the first sampling frequency is greater than 10 Hz.

4. A geothermal power plant according to claim 1 wherein the sampling frequency is variable during operation.

5. A geothermal power plant system according to claim 1 wherein the means to transmit the data to surface is a cable selected from a group comprising an electrical cable and an encapsulated fibre optic cable.

6. A method of operating a geothermal power plant, the plant comprising: an injection well and a production well, the wells being spaced apart and accessing a geothermal formation; a pump to pump operating fluid at a pump pressure into the injection well for extraction as hot operating fluid from the production well; and an energy conversion unit to transfer energy from the hot operating fluid to another energy; the method comprising the steps of:
locating a downhole pressure gauge in at least one well;
recording a change in pressure in the at least one well as a pressure trace;
transmitting the pressure trace as data to surface at a first sampling frequency;
storing the data in the surface data acquisition unit;
calculating at least one fracture parameter from the stored data; and
adjusting the pump rate based on the at least one fracture parameter;
wherein the well is stimulated by pumping an aqueous fluid into the geothermal formation and there are a plurality of cycles of pumping the aqueous fluid with each cycle terminating in a shut-in period; the pump rate for each cycle is determined from a measurement of downhole pressure; and the process is a-seismic in that the pump rate is low to prevent shocking the formation and the temperature of the aqueous fluid is low to induce tensile failure in the rock and thereby provide a fracture network of very high conductivity fractures and high conductivity fractures with sufficient lateral extension for efficient heat transfer.

7. A method of operating a geothermal power plant according to claim 6 wherein the fracture parameters are selected from a group comprising one or more of: fracture length, volume of fractures, lateral extension of fractures, surface fractures and estimation of global fracture network shape.

8. A method of operating a geothermal power plant according to claim 6 wherein the downhole pressure gauge is located in the injection well.

9. A method of operating a geothermal power plant according to claim 6 wherein the downhole pressure gauge is located in the production well.

10. A method of operating a geothermal power plant according to claim 6 wherein the change in pressure is induced in the wellbore by shut-in.

11. A method of operating a geothermal power plant according to claim 6 wherein the pressure trace is treated with a fast Fourier Transform.

12. A method of operating a geothermal power plant according to claim 6 wherein the injection rate for pumping the aqueous fluid is less than 15 bpm (barrels per minute).

13. A method of operating a geothermal power plant according to claim 6 wherein the injection rate varies in each cycle.

14. A method of operating a geothermal power plant according to claim 6 wherein the aqueous fluid is cooled before injection.

15. A method of operating a geothermal power plant according to claim 6 wherein the injection rate for pumping the aqueous fluid, injection duration, pressure and shut-in period duration for each cycle are determined from analysis of fracture parameters calculated from previous cycles.

16. A method of operating a geothermal power plant according to claim 6 wherein the downhole pressure gauge has a data collection rate of at least 1 Hz.

17. A method of operating a geothermal power plant according to claim 6 wherein the aqueous fluid is water from the production well.

* * * * *